United States Patent
Kokai et al.

(10) Patent No.: US 11,916,394 B2
(45) Date of Patent: Feb. 27, 2024

(54) RENEWABLE ENERGY SYSTEM STABILIZATION SYSTEM AND SYSTEM STABILIZATION SUPPORT METHOD

(71) Applicant: HITACHI, LTD., Tokyo (JP)

(72) Inventors: Yutaka Kokai, Tokyo (JP); Eisuke Kuroda, Tokyo (JP); Kunihiko Tsunedomi, Tokyo (JP)

(73) Assignee: HITACHI, LTD., Tokyo (JP)

( * ) Notice: Subject to any disclaimer, the term of this patent is extended or adjusted under 35 U.S.C. 154(b) by 97 days.

(21) Appl. No.: 17/781,400

(22) PCT Filed: Sep. 1, 2020

(86) PCT No.: PCT/JP2020/033146
§ 371 (c)(1),
(2) Date: Jun. 1, 2022

(87) PCT Pub. No.: WO2021/124614
PCT Pub. Date: Jun. 24, 2021

(65) Prior Publication Data
US 2023/0012079 A1      Jan. 12, 2023

(30) Foreign Application Priority Data
Dec. 20, 2019  (JP) .................................. 2019-230923

(51) Int. Cl.
*H02J 3/38*        (2006.01)
*H02J 3/00*        (2006.01)

(52) U.S. Cl.
CPC .............. *H02J 3/381* (2013.01); *H02J 3/003* (2020.01); *H02J 3/004* (2020.01); *H02J 3/0012* (2020.01); *H02J 2300/20* (2020.01)

(58) Field of Classification Search
CPC .......... H02J 3/381; H02J 3/0012; H02J 3/003; H02J 3/004; H02J 2300/20; H02J 2300/22;
(Continued)

(56) References Cited

U.S. PATENT DOCUMENTS

2015/0194966 A1    7/2015  Kimura et al.
2017/0145925 A1*   5/2017  Kusumi .................. F02C 7/057

FOREIGN PATENT DOCUMENTS

JP       2015-130777 A       7/2015

OTHER PUBLICATIONS

Hiroji Ota, et al., "Development of Transient Stability Controller System (TSC) Based on On-Line Stability Calculation", T. Iee Japan, vol. 115-B, No. 1. 1995.
(Continued)

*Primary Examiner* — Richard Tan
(74) *Attorney, Agent, or Firm* — MATTINGLY & MALUR, PC

(57) ABSTRACT

Provided are an operation limit value management unit managing an operation limit value related to the power flow power of system equipment and a determination unit calculating the power flow state for each set time of the future of a power system based on load dispatching information including a power generation plan value, a predicted output value, and a predicted value of power demand and determining whether or not stable is each power flow state by comparison with the operation limit value. The determination unit sequentially changes the first output power of a first power source defined by the power generation plan value of the first power source and calculates each power flow state based on power including the changed first output power and a predicted value of the output of a second power source.

15 Claims, 8 Drawing Sheets

(58) Field of Classification Search
CPC ........ H02J 3/24; H02J 3/46; H02J 3/06; H02J 3/00; H02J 3/38
USPC .......................................................... 307/43
See application file for complete search history.

(56) References Cited

OTHER PUBLICATIONS

International Search Report of PCT/JP2020/033146 dated Oct. 27, 2020.

* cited by examiner

[FIG. 1]
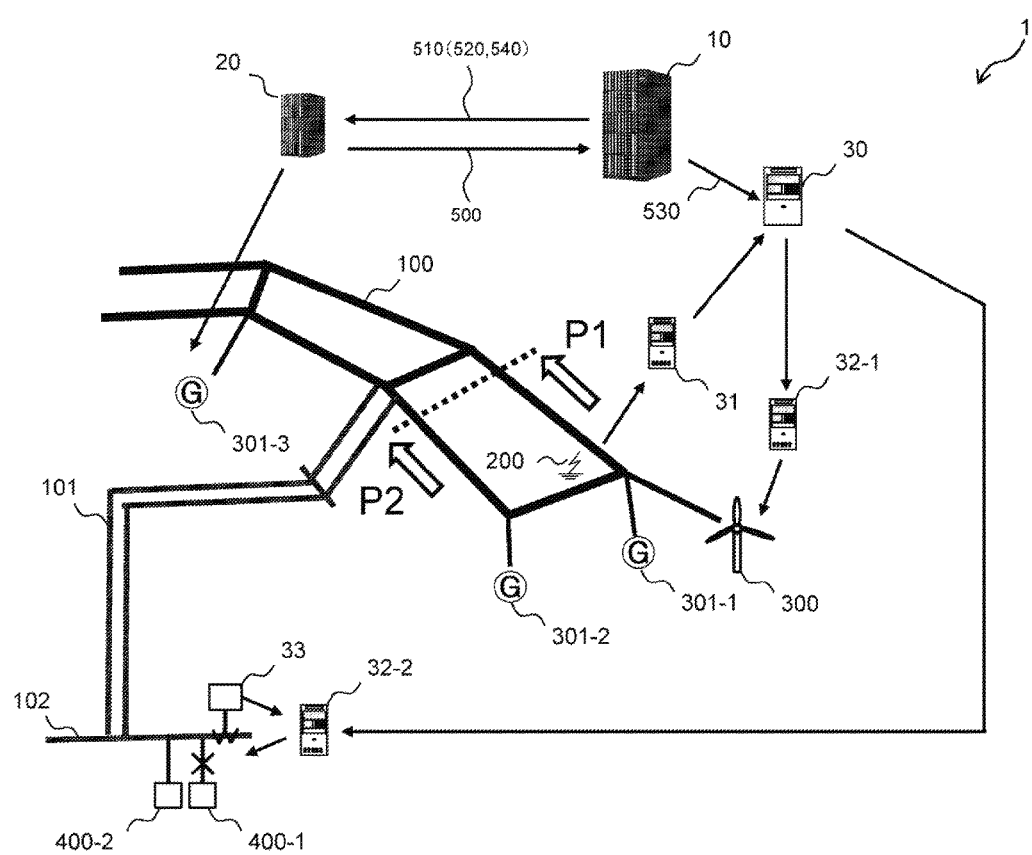

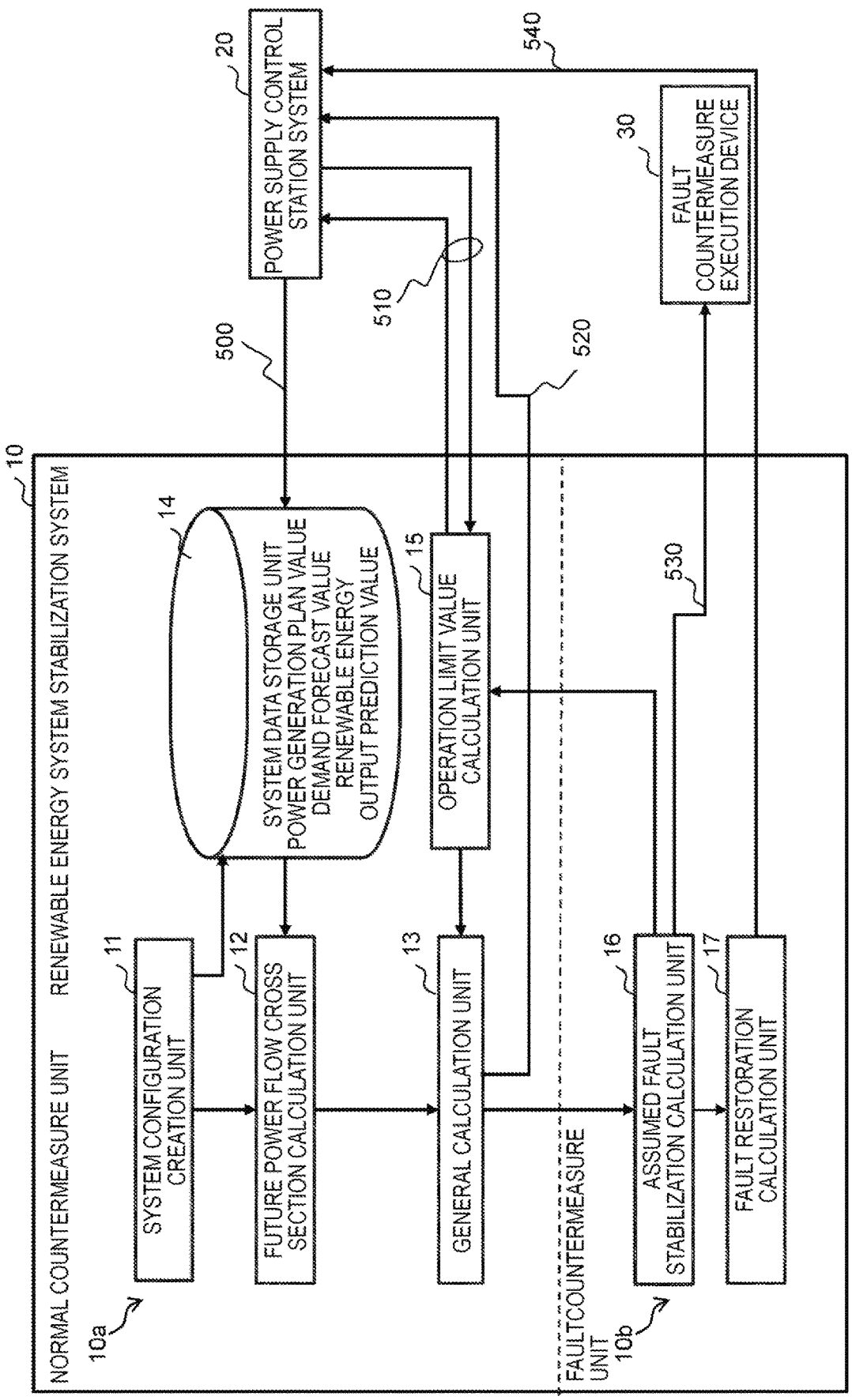
[FIG. 2]

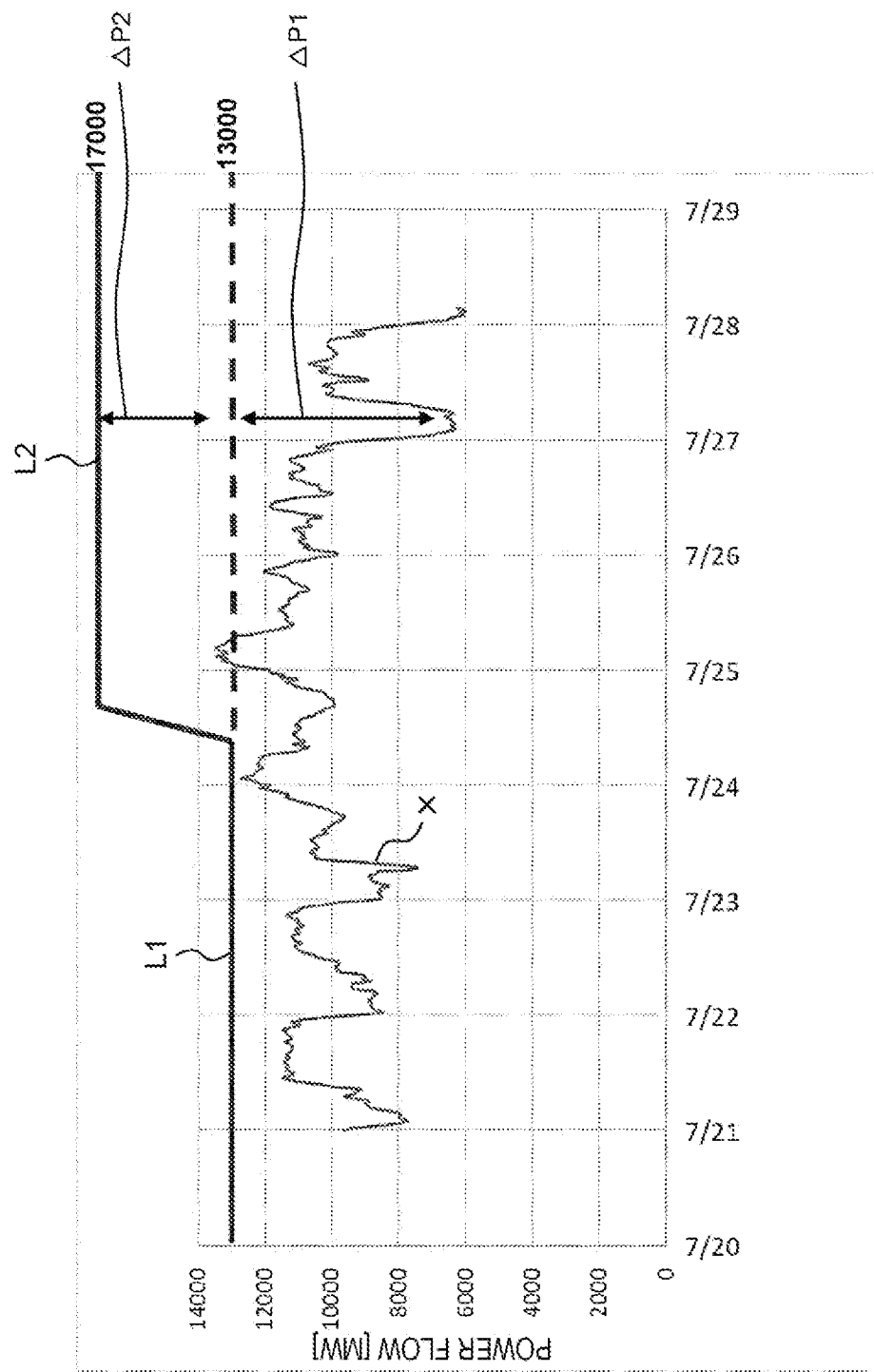
[FIG. 3]

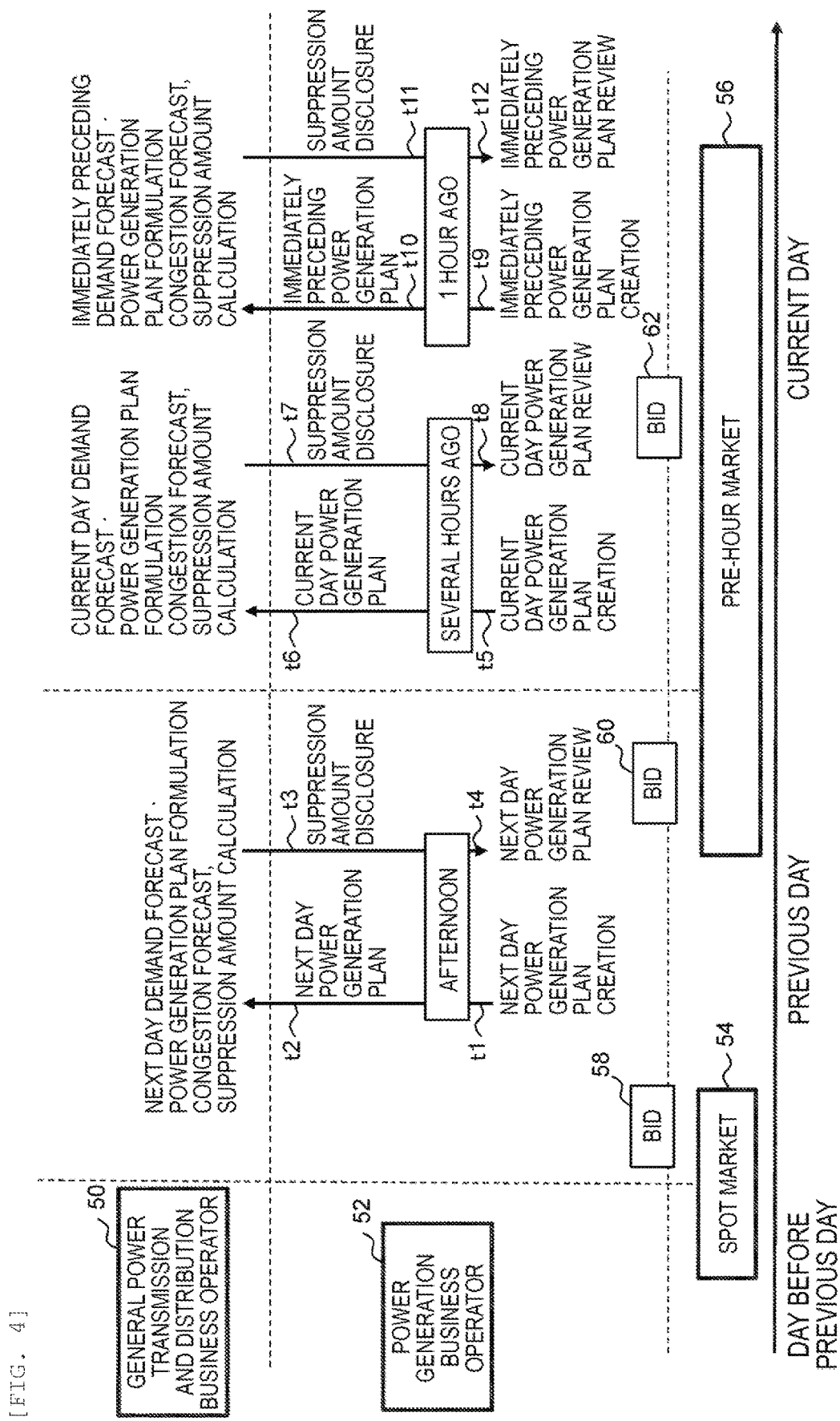
[FIG. 4]

[FIG. 5A]
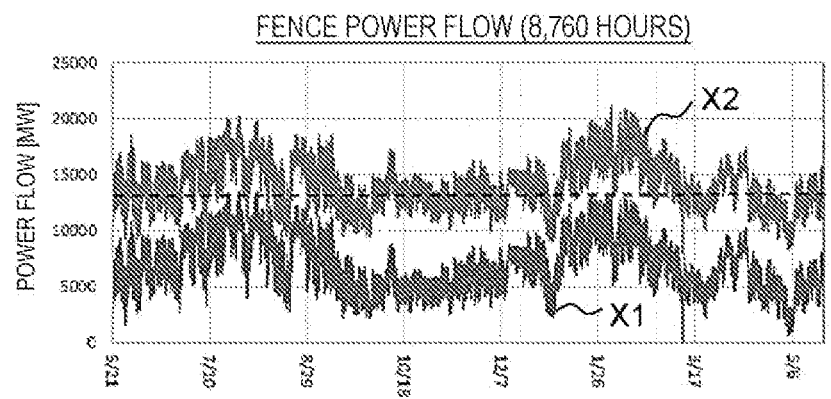
[FIG. 5B]
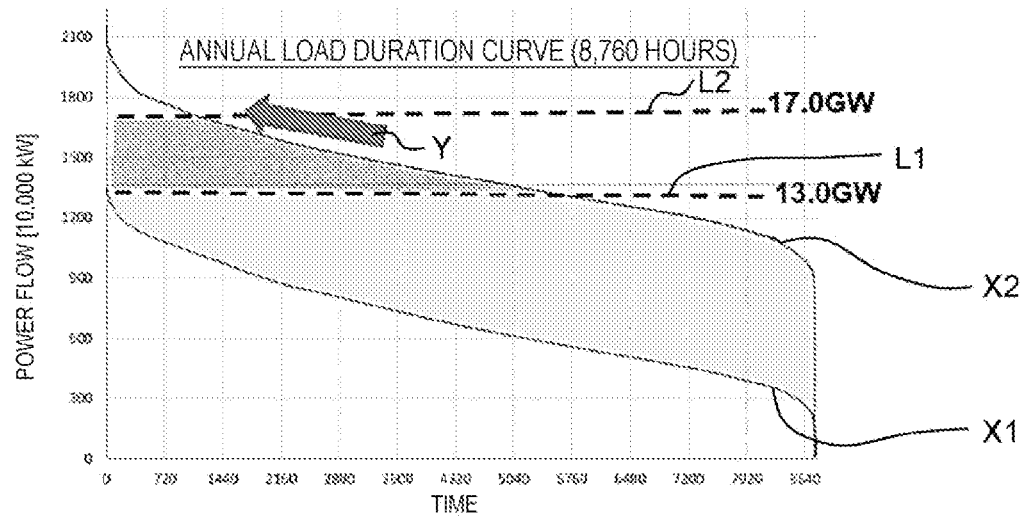

[FIG. 6]
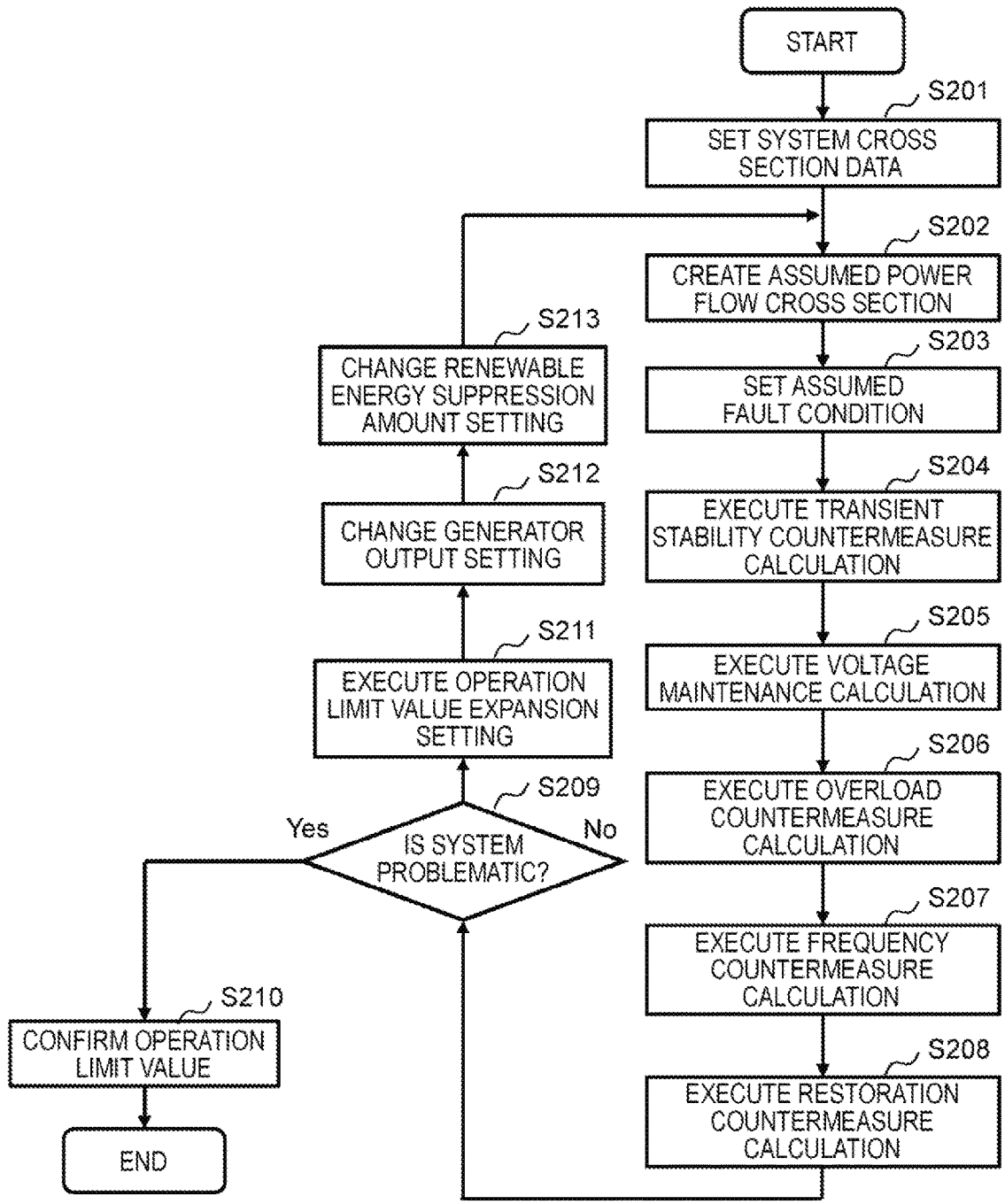

[FIG. 7A]
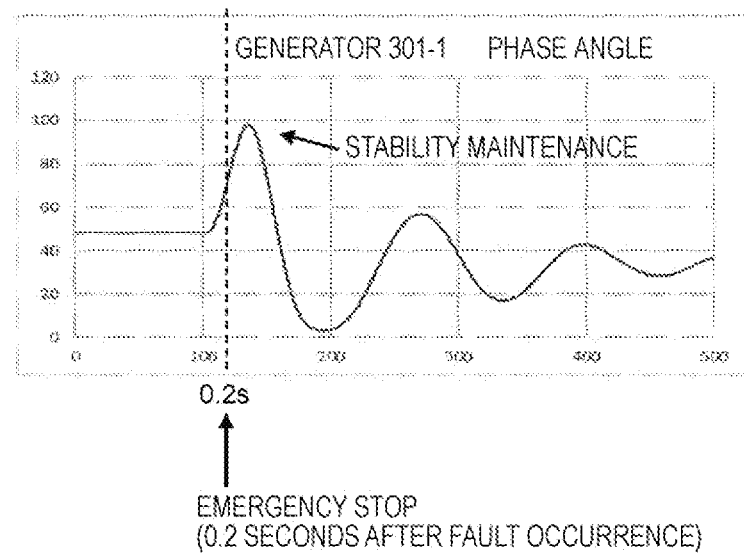
[FIG. 7B]
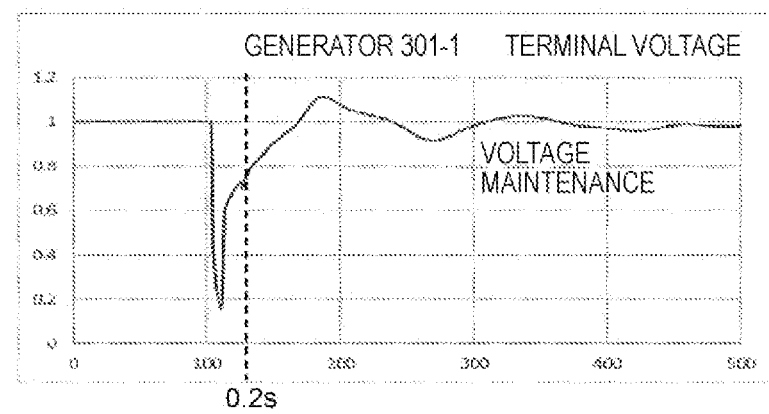

[FIG. 7C]
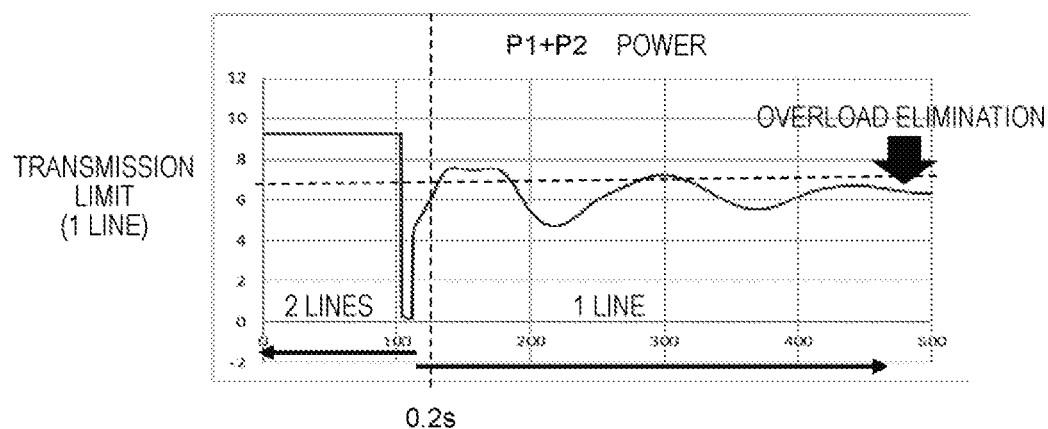
[FIG. 7D]
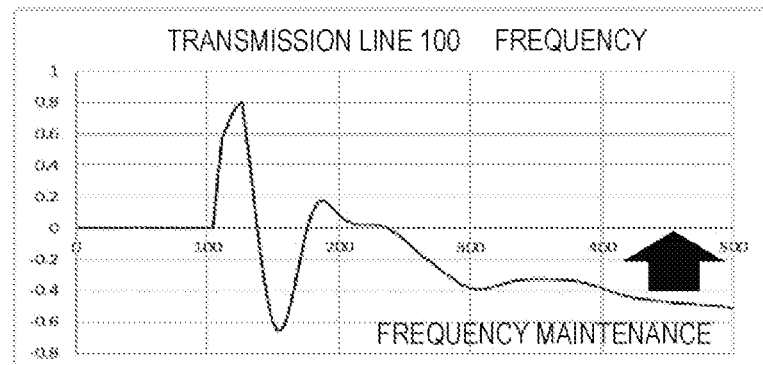

RENEWABLE ENERGY SYSTEM STABILIZATION SYSTEM AND SYSTEM STABILIZATION SUPPORT METHOD

TECHNICAL FIELD

The present invention relates to a renewable energy system stabilization system and a system stabilization support method for supporting power system stabilization using renewable energy.

BACKGROUND ART

In an example of control in a power system stabilization system for suppressing a fluctuation in electrical system state quantity occurring is a power system, a required amount of generators shut off (called generator shedding) in order to transiently stabilize the power system or prevent transmission line or transformer overload with respect to a fault on a transmission line or the like. In another example of the control, a required amount of load is shed (called load shedding) for power system fluctuation suppression in the event of power system frequency drop. In a case where the control for suppressing the fluctuation in system state quantity is executed, it is necessary to make an adjustment in accordance with the state of the power system.

Meanwhile, there is a method for predicting in advance a system state quantity fluctuation that may occur in a power system, presetting the content of fluctuation suppression control in accordance with the prediction result, and performing the preset control in the event of the fluctuation. For example, as described in NPL 1 ("Development of Transient Stability Controller System (TSC) Based on On-Line Stability Calculation"), there is a system in which a required amount generators are shut off so that the transient stability of the system is maintained with respect to, for example, transmission line malfunction.

This system adopts a configuration in which a system state quantity is periodically captured, transient stability calculation is performed in advance regarding a plurality of assumed fault cases to obtain a required amount of generator shedding machines, and the obtained content is recorded in a control table and updated to prepare for an actual fault. Then, in the event of actual malfunction, this system searches the pre-obtained generator shedding machines for one that corresponds to the fault and shuts off the searched generator shedding machine for power system stabilization.

Meanwhile, a large number of renewable energy apparatuses such as wind and photovoltaic power generation apparatuses have been introduced in recent years. At this time, when the power of the renewable energy apparatus is supplied to an existing power system, the power flowing through system equipment such as a transmission line and a transformer fluctuates greatly, which may lead to an overload problem on a normal occasion, a stability maintenance problem in the event of a fault, or the like. In order to solve these problems, it is known to control a renewable energy apparatus and a generator to maintain stability as in JP-A-2015-130777 (PTL 1).

CITATION LIST

Patent Literature

PTL 1: JP-A-2015-130777

Non-Patent Literature

NPL 1: Journal of the Institute of Electrical Engineers of Japan Vol. 115-B, No. 1 (January 1995)

SUMMARY OF INVENTION

Technical Problem

Output from a renewable energy apparatus such as a photovoltaic power generation apparatus and a wind power generation apparatus greatly fluctuates in a short time. Accordingly, supervisory control and data acquisition/energy management system, which is a typical example of a load dispatching monitoring and control system monitoring and controlling the power and voltage of a power system, constantly monitors the power flowing through transmission equipment every several seconds. In a case where an operator determines that the power flowing through the transmission equipment may exceed the operation limit value of the transmission equipment (limit value determined by a heat limit or the like), the operator performs operation to adjust the output of the generators at both ends of the equipment that may be overloaded (generator replacement) and an output suppression command is given to the renewable energy apparatus and the generator for overload elimination. However, in a case where the system equipment is a loop-shaped bulk power system, the output suppression is applied to a plurality or generators, and thus an operator cannot but undergo trial and error in order to calculate an appropriate overload elimination amount.

In addition, a generator is shaken for approximately 10 seconds in the event of a system fault attributable to a lightning fault or the like, and a stabilization countermeasure system emergency-stopping a generator is known, as described in NPL 1, so that the transient stability of such a generator is maintained. Meanwhile, with renewable energy apparatus introduction into power systems increasing in scale, output from a renewable energy apparatus tends to greatly fluctuate in a short time, a transient power system movement different from a movement of an assumed fault case may occur, and a previously assumed stabilization measure may become inappropriate.

In this regard, in pre-calculation performed in a system stabilization system, post-calculation and post-correction after the occurrence of a system fault may be required for control with certain time delay and control amount margins. However, when a large number of renewable energy apparatuses are operated, output from the renewable energy apparatuses fluctuates in a short time, and thus the post-calculation and the post-correction may also become inappropriate.

In addition, unlike general generators, a renewable energy apparatus is operated with a constant power factor in most cases, the amount by which reactive power is supplied to or absorbed from a power system in a short time is not large, and thus the voltage of system equipment is likely to fluctuate. For example, in the case of a stopped generator, a decrease in power system frequency occurs, and thus the demand load corresponding to the output of the stopped generator is urgently shed. However, on condition that the voltage of the power system rises at this time, the load of the power system becomes heavy, and then an insufficient control amount and a significant decrease in power system frequency arise without voltage correction being added to the load shedding amount. As a result, many generators in the power system may stop one after another to result in a power system-wide outage (so-called blackout).

An object of the present invention is to change a system equipment operation limit value in accordance with the power flow state of a power system even in the event of an increase in power from renewable energy apparatus connected to the power system.

Solution to Problem

In order to achieve the above object, the present invention provides a system supporting operation of a power system connecting a load and at least one of a first power source including a thermal power generator generating electricity using at least thermal power as power generation energy and a second power source including a renewable energy apparatus generating electricity with renewable energy, the system including: an operation limit value management unit managing an operation limit value related to power flow power of system equipment; and a determination unit calculating a power flow state for each set time of future of the power system based on load dispatching information including a power generation plan value of the first power source, a predicted value of output of the second power source, and a predicted value of power demand in the power system and determining whether or not stable is each calculated power flow state by comparing each calculated power flow state with the operation limit value, in which the determination unit sequentially changes first output power of the first power source defined by the power generation plan value of the first power source, calculates each of the power flow states based on power including the changed first output power and the predicted value of the output of the second power source, and outputs a result of the calculation to the operation limit value management unit, and, on condition that a positive determination result is obtained from the determination unit, the operation limit value management unit manages the operation limit value at each set time of the future as a sum of the changed first output power and the predicted value of the output of the second power source added to the changed first output power.

Advantageous Effects of Invention

According to the present invention, it is possible to change a system equipment operation limit value in accordance with the power flow state of a power system even in the event of an increase in power from a renewable energy apparatus connected to the power system.

The other effects of the present invention will be described herein.

BRIEF DESCRIPTION OF DRAWINGS

FIG. 1 is an overall configuration diagram of a power system system according to an example of the present invention.

FIG. 2 is a configuration diagram for describing a specific configuration of a renewable energy system stabilization system according to an example of the present invention.

FIG. 3 is an explanatory diagram for describing the relationship between an operation limit value and power flow power according to an example of the present invention.

FIG. 4 is an explanatory diagram illustrating an example of power generation plan creation processing after the introduction of a non-firm-type connection power source according to an example of the present invention.

FIG. 5A is a characteristic diagram of a fence power flow.

FIG. 5B is a characteristic diagram of an annual load duration curve.

FIG. 6 is a flowchart describing the processing of an assumed fault stabilization calculation unit according to an example of the present invention.

FIG. 7A is a characteristic diagram of the phase angle of a generator.

FIG. 7B is a characteristic diagram of the terminal voltage of the generator.

FIG. 7C is a characteristic diagram of the power flow power.

FIG. 7D is a characteristic diagram of the frequency of a transmission line.

DESCRIPTION OF EMBODIMENTS

Hereinafter, examples of the present invention be described with reference to the drawings.

FIG. 1 is an overall configuration diagram of a power system system according to an example of the present invention. In FIG. 1, a power system system 1 is a system managing a power system connecting a power source and a load, for example, a system configured by transmission lines 100 and 101, a bus 102, and so on, and includes a renewable energy system stabilization system (hereinafter, referred to as a renewable energy system stabilization system) 10, a load dispatching control station system (load dispatching monitoring control system) 20, and a fault countermeasure execution device 30. At this time, the renewable energy system stabilization system 10 is capable of transmitting and receiving information by wire or wirelessly to and from the load dispatching control station system 20 and the fault countermeasure execution device 30. It should be noted that energy that is renewable may be referred to as renewable energy in the following description.

Thermal power generators (first power sources) 301-1, 301-2 and 301-3 which generate electricity using thermal power as power generation energy, are connected to the transmission line 100. At this time, the thermal power generators 301-1 and 301-2 are connected to an end portion of the loop-shaped transmission line 100, and a renewable energy apparatus (second power source) 300, which generates electricity using offshore wind power as power generation energy, is connected to the end portion of the transmission line 100. The transmission line 101, which branches off from the transmission line 100, is connected to the bus 102. Loads 400-1 and 400-2 are connected to the bus 102.

The load dispatching control station system 20 operates the power system and is configured by, for example, a computer device including a central processing unit (CPU), an input device, an output device, a communication device, and a storage device. At this time, the load dispatching control system 20 monitors the state of the power system based on a value measured by system equipment (not illustrated) including various measuring instruments measuring the voltage, current, and power of the power system, generates load dispatching information including a power generation plan value related to each of the thermal power generators 301-1, 301-2, and 301-3, a renewable energy output prediction value related to the renewable energy apparatus 300, and a demand forecast value in the power system, and transmits the generated load dispatching information 500 to the renewable energy system stabilization system 10. It should be noted that the load dispatching control station system 20 is also capable of transmitting, to the renewable energy system stabilization system 10, system configuration-related system configuration data generated based on values measured by various measuring instruments (including a voltmeter, an ammeter, and a wattmeter) as online information on the power system in addition to the load dispatching information 500.

The renewable energy system stabilization system 10 generates a system equipment operation limit value, which is an operation limit value (operation target value) when the load dispatching control system 20 operates the power system, based on the load dispatching information 500 received from the load dispatching control station system 20 and transmits operation limit value information 510 including the generated operation limit value to the load dispatching control station system 20. At this time, the renewable energy system stabilization system 10 calculates the operation limit value in the loop-shaped transmission line 100 based on, for example, power flow power P1+P2 including the output power (first output power) from the output of the thermal power generators 301-1 and 301-2 and the output power (second output power) from the output of the renewable energy apparatus 300.

In addition, the renewable energy system stabilization system 10 generates a renewable energy output suppression amount for suppressing the output power of the renewable energy apparatus 300 based the load dispatching information 500 received from the load dispatching control station system 20 and transmits renewable energy output suppression amount information 520 including the generated renewable energy output suppression amount to the load dispatching control station system 20. Further, the renewable energy system stabilization system 10 executes calculation assuming a fault in the power system based on the load dispatching information 500 received from the load dispatching control station system 20, generates information on a control countermeasure defining control content in the event of a fault in the power system, records the information in a control countermeasure table (not illustrated), and transmits the information recorded in the control countermeasure table to the fault countermeasure execution device 30 as control countermeasure information 530. In addition, the renewable energy system stabilization system 10 generates restoration support information on a post-power system fault restoration countermeasure based on the load dispatching information 500 received from the load dispatching control station system 20 and transmits the generated restoration support information 540 to the load dispatching control station system 20.

The fault countermeasure execution device 30 is configured by, for example, a computer device including a CPU, an input device, an output device, a communication device, and a storage device. At this time, the CPU functions as a control command unit transmitting and receiving information to and from the renewable energy system stabilization system 10 via the communication device, recording the control countermeasure information 530 received from the renewable energy system stabilization system 10 in the storage device, generating a control command for executing a fault countermeasure based on the control countermeasure information 530 recorded in the storage device, and outputting the generated control command to control execution units 32-1 and 32-2. The control execution units 32-1 and 32-2 control the system equipment disposed on the transmission lines 100 and 101 and the bus 102 and manage the renewable energy apparatus 300 as control object. Examples of the system equipment include a switch (connecting or disconnecting a capacitor or a coil to and from, for example, the transmission line 100), a switcher a circuit breaker, a voltage regulator position adjustment-type transformer with an adjustable tap position), and a protective relay, which are not illustrated.

In addition, a fault detection unit (fault detector) 31 detecting a system fault 200 on the transmission line 100 and a voltage detection unit (voltmeter) 33 detecting the voltage of the bus 102 are disposed as system equipment. Here, in the event of the system fault 200 on the transmission line 100, the system fault 200 is detected by the fault detection unit 31 and the detection result is transferred from the fault detection unit 31 to the fault countermeasure execution device 30. In addition, the voltage of the bus 102 is detected by the voltage detection unit 33 and the detection result is transferred from the voltage detection unit 33 to the fault countermeasure execution device 30 via the control execution unit 32-2.

The fault countermeasure execution device 30 generates a control command based on the control countermeasure information 530 and outputs the generated control command to the control execution units 32-1 and 32-2. For example, in the event of the system fault 200 on the transmission line 100, the countermeasure execution device 30 refers to the control countermeasure information 530 based on the detection result of the fault detection unit 31, generates a control command for an emergency stop of the renewable energy apparatus 300 based on the control countermeasure information 530, and outputs the generated control command to the control execution unit 32-1. In this case, the control execution unit 32-1 executes control for an emergency stop of the renewable energy apparatus 300 in accordance with the control command with respect to the renewable energy apparatus 300.

In addition, in a case where is necessary to suppress the output power of the renewable energy apparatus 300, the fault countermeasure execution device 30 generates a control command for suppressing the output power of the renewable energy apparatus 300 based on the control countermeasure information 530 and outputs the generated control command to the control execution unit 32-1. In this case, the control execution unit 32-1 executes control for suppressing power of the renewable energy apparatus 300 in accordance with the control command with respect to the renewable energy apparatus 300.

Further, in a case where it is necessary to shed the load 400-1 connected to the bus 102 from the bus 102, the fault countermeasure execution device 30 generates a control command for shedding the load 400-1 from the bus 102 based on the control countermeasure information 530 and outputs the generated control command to the control execution unit 32-2. In this case, the control execution unit 32-2 executes circuit breaker off control in accordance with the control command with respect to the circuit breaker (not illustrated) disposed between the bus 102 and the load 400-1.

FIG. 2 is a configuration diagram for describing a specific configuration of the renewable energy system stabilization system according to an example of the present invention. In FIG. 2, the renewable energy system stabilization system 10 is configured by, for example, a computer device including, a CPU, an input device, an output device, a communication device, and a storage device.

The CPU is configured as a central processing unit that comprehensively controls the operation of the entire system. The input device is configured by a keyboard or a mouse, and the output device is configured by a display or a printer.

In addition, the communication device configured to include a network interface card (NIC) for connection to a wireless LAN or a wired LAN. Further, the storage device is configured by a storage medium such as a random access memory (RAM) and a read only memory (ROM).

The storage device stores various computer programs that are executed by the CPU and a database that is processed by the CPU and stores various kinds of data. For example, the storage device stores a system configuration creation program functioning as a system configuration creation unit 11, a future power flow cross section calculation program functioning as a future power flow cross section calculation unit 12, a general calculation program functioning as a general calculation unit 13, a database functioning as a system data storage unit 14, and an operation limit value calculation program functioning as an operation limit value calculation unit 15, each of which is a program or a database belonging to a normal countermeasure unit 10*a*. In addition, the storage device stores an assumed fault stabilization calculation program functioning as an assumed fault stabilization calculation unit 16 and a fault restoration calculation program functioning as the fault restoration calculation unit 17, which are programs belonging to a fault countermeasure unit 10*b*.

The system data storage unit 14 stores data on the power generation plan value, the demand forecast value, and the renewable energy output prediction value, which are data belonging to the load dispatching information 500 transmitted from the load dispatching control station system 20. The above-mentioned data are, for example, data for each set time of the future based on the time of data collection, planning, or prediction value calculation and are data for every 15 minutes up to 24 hours ahead.

The system configuration creation unit 11 captures online information on the state of system equipment connection (e.g. switch on-off state and switcher on-off state) and the state of the power system from the system equipment (switch, switcher, circuit breaker, protective relay, voltmeter, ammeter, and wattmeter) connected to the power system, creates a system mode in accordance with the system equipment connection state, and creates system configuration-indicating (power system configuration-indicating) system configuration data from the created system model. For example, a system model indicating, for example, load, transmission line, and system equipment connection states is created regarding the transmission line 100 connected to the thermal power generators 301-1 and 301-2. The system configuration creation unit 11 transfers the system configuration data obtained from the created system model to the future power flow cross section calculation unit 12 and stores the system configuration data in the system data storage unit 14.

The future power flow cross section calculation unit 12 calculates the active power and the reactive power flowing in the power system and the voltage of the system equipment based on the system configuration data by a calculation method called power flow calculation and outputs the calculation result to the general calculation unit 13. At this time, the future power flow cross section calculation unit 12 obtains, for example, information indicating a cross section of the future power flow for every 15 minutes up to 24 hours ahead based on the time of data collection or calculation (future power flow state-indicating information), which is information on the active power and the reactive power flowing in the power system and the system equipment voltage.

In a case where the operation limit value information 510 on an operation limit value determined by an operator is received from the load dispatching control station system 20, the operation limit value calculation unit 15 calculates the latest operation limit value based on the operation limit value belonging to the received operation limit value information 510 and an operation limit value indicating the result of transient stability calculation with respect to an assumed fault, which is a calculation result of the assumed fault stabilization calculation unit 16, transfers the calculated latest operation limit value to the general calculation unit 13, and transmits information on the latest operation limit value to the load dispatching control station system 20 as the operation limit value information 510.

In a case where the system equipment is operated using the latest operation limit value based on the calculation result of the future power flow cross section calculation unit 12 and the latest operation limit value calculated by the operation limit value calculation unit 15, the general calculation unit 13 determines whether or not the power system is stable in the cross section of the power flow for each set time of the future (e.g. power flow state for every 15 minutes up to 24 hours ahead). For example, the general calculation unit 13 determines whether or not the power system is to be overloaded in a case where the system equipment is operated using the latest operation limit value and, in the event of a determination result that the power system is to be overloaded (unstable), the general calculation unit 13 executes calculation for suppressing the output of renewable energy apparatus 300, suppressing the output of the thermal power generators 301-1 and 301-2, or performing an increase in output. Then, the general calculation unit 13 transmits, for example, the renewable energy output suppression amount information 520 indicating a renewable energy output suppression amount with respect to the renewable energy apparatus 300 to the load dispatching control station system 20 as the calculation result.

In addition, in the event of determination result that the power system is overloaded and unstable (negative determination result), the general calculation unit 13 also functions as an output adjustment information generation unit generating output adjustment information for adjusting at least one of the output power (first output power) from the output of the thermal power generators 301-1, 301-2, and 301-3 (first power sources) and the output power (second output power) from the output of the renewable energy apparatus 300 (second power source). At this time, the general calculation unit 13 is capable of adding the output adjustment information to the renewable energy output suppression amount information 520 and transmitting the information to the load dispatching control station system 20.

Here, in a case where the output of the renewable energy apparatus 300 in a certain area is increased on a normal occasion, a generator (thermal power generator) in the area is operated with the output of the generator suppressed or the generator is stopped such that the power flow power of the power system becomes equal to or less than the operation limit value of transmission equipment. However, a decrease in the number of generators connected to the power system results in a decline in the frequency adjustment capability in the power system, and thus a significant frequency disturbance may arise in the event of a power system demand fluctuation.

Taking such an issue into consideration, the general calculation unit performs generator output adjustment amount calculation, calculates a renewable energy output suppression amount by comparing the calculation result with an operation limit value, and transmits the renewable energy suppression amount information 520 including the calculated renewable energy output suppression amount to the load dispatching control station system 20. At this time, the operator of the load dispatching control station system 20 discloses information on the output suppression amount of the renewable energy apparatus 300 via a homepage or the like based on the renewable energy output suppression amount information 520 received from the general calculation unit 13.

The assumed fault stabilization calculation unit 16 inputs information including the power generation plan value of the first power source, a predicted value of the output of the second power source, and a predicted value of the power demand in the power system and, based on the input information, repeatedly executes time axis simulation processing called transient stability calculation with respect to hundreds of assumed fault cases set in advance. In a case where unstable is the result of the time axis simulation processing, the assumed fault stabilization calculation unit 16 determines whether or not the power system becomes stable by implementing a countermeasure such as generator shedding and load shedding. In a case where stable is the determination result, the assumed fault stabilization calculation unit 16 records information on the amount of control such as generator shedding and load shedding in the control countermeasure table (not illustrated) and transmits the information recorded in the control countermeasure table to the fault countermeasure execution device 30 as the control countermeasure information 530.

In a case where it is determined that stable is the transient stability calculation result, the assumed fault stabilization calculation unit 16 further raises the operation limit value, increases assumed transmission power, and repeatedly executes the time axis simulation processing of hundreds of assumed fault cases again. At this time, the assumed fault stabilization calculation unit sequentially determines whether or not unstable becomes the result of the time axis simulation processing in the process of sequentially raising the operation limit value and transfers each determination result to the operation limit value calculation unit 15. In a case where the determination result of becoming unstable is obtained after the determination result of stable is obtained from the assumed fault stabilization calculation unit 16, the operation limit value calculation unit 15 registers the operation limit value raised when the determination result of stable is obtained lastly as a new operation limit value and transmits the operation limit value information 510 including the registered operation limit value to the load dispatching control station system 20.

The fault restoration calculation unit 17 creates restoration support information for returning the state of the power system to a pre-fault state based on the system state after actually taking the assumed fault stabilization countermeasure determined by the calculation of the assumed fault stabilization calculation unit 16, examples of which include the state of the power system after the implementation of generator shedding or load shedding by a stabilization countermeasure, and transmits the created restoration support information 540 to the load dispatching control station system 20.

Upon receiving the operation limit value information 510 including the new operation limit value, the load dispatching control station system 20 notifies the owner of the renewable energy apparatus 300 of the operation limit value information 510 including the new operation limit value or discloses the content of the operation limit value information 510 via the homepage or the like. By looking at the disclosed content of the operation limit value information 510, the owner of the renewable energy apparatus 300 can utilize information on the new operation limit value in bidding for a next day or subsequent transaction in a power generation market. As a result, it is possible to reduce the risk of loss of power generation opportunities attributable to transmission line congestion suppressing the renewable energy apparatus 300.

FIG. 3 is an explanatory diagram for describing the relationship between the operation value and the power flow power according to an example of the present invention. In FIG. 3, the horizontal axis is month and day and the vertical axis is power flow (MW). The power flow power (P1+P2) in the power system may greatly fluctuate from day to day as indicated by the curve X. At this time, in a case where an operation limit value (first operation limit value) L1 before the renewable energy apparatus 300 is connected to the power system is, for example, 13,000 (MW), the operation limit value L1 is different from the actual power flow power (P1+P2), and this difference an available capacity. The available capacity is an amount (power amount) that can be output by the renewable energy apparatus 300 connected to the power system as a "non-firm-type connection" power source. Here, the "non-firm-type connection" power source means a power source that is connected under an output suppression agreement when there is no available capacity.

Accordingly, on condition that the operation limit value can be, for example, raised from L1=13,000 (MW) to L2=17,000 (MW), the power that can be output from the renewable energy apparatus 300 to the power system (outputtable amount) is the sum of a renewable energy output increment ΔP1 corresponding to the difference between the operation limit value L1 and the power flow power (P1+P2) and a renewable energy output increment ΔP2 corresponding to the difference between the operation limit value L2 and the operation limit value L1. When the renewable energy apparatus 300 is capable of generating power that is the renewable energy output increment ΔP1 plus the renewable energy output increment ΔP2 in amount and the generated power is capable of flowing through, for example, the transmission line 100, the electric power generation of the thermal power generator 301-1 and the thermal power generator 301-2 can be reduced and, as a result, the $CO_2$ that is generated as a result of the power generation of the thermal power generator 301-1 and the thermal power generator 301-2 can be reduced. It should be noted that the operation limit value L2 is a second operation limit value applied to the power system and power equipment after the renewable energy apparatus 300 is connected to the power system.

FIG. 4 is an explanatory diagram illustrating an example of power generation plan creation processing after the introduction of the non-firm-type connection power source according to an example of the present invention. In FIG. 4, data is exchanged between a general power transmission and distribution business operator 50 and a power generation business operator 52. At this time, a spot market 54 is prepared on the day before the previous day, a pre-hour market 56 is prepared from the previous day to the current day, and a bid 56 with respect to the spot market 54 and bids 60 and 62 with respect to the pre-hour market 56 are possible. On the previous day, the power generation business operator 52 creates a power generation plan for the next day at time t1 and submits information on the created power generation plan for the next day to the general power transmission and distribution business operator 50 at time t2.

In response thereto, the general power transmission and distribution business operator 50 forecasts the power demand for the next day, formulates a power generation plan for the next day, and predicts (evaluates) whether or not the transmission equipment is to be overloaded (congested) based on the power demand forecast result and the power generation plan formulation result. In a case where it is predicted that the transmission equipment is to be overloaded, the general power transmission and distribution business operator 50 calculates the amount of suppression required to eliminate the overload and discloses information on the calculated suppression amount to the power generation business operator 52 on the homepage or the like at time t3. Then, the power generation business operator 52 reviews the power generation plan for the next day at time t4 based on the disclosed information.

Likewise, on the current day, the power generation business operator 52 creates a power generation plan for the current day at time t5 up to 1+α hours (several hours) before the actual supply and demand cross section and submits information on the created power generation plan for the current day to the general power transmission and distribution business operator 50 at time t6. In response thereto, the general power transmission and distribution business operator 50 forecasts the power demand for the current day, formulates a power generation plan for the current day, and predicts evaluates) whether or not the transmission equipment is to be overloaded (congested) based on the power demand forecast result and the power generation plan formulation result. In a case where it is predicted that the transmission equipment is to be overloaded, the general power transmission and distribution business operator 50 calculates the amount of suppression required to eliminate the overload and discloses information on the calculated suppression amount to the power generation business operator 52 on the homepage or the like at time t7. The power generation business operator 52 reviews the power generation plan for the current day at time t8 based on the disclosed information.

Further, the same processing is repeated up to 1 hour before the actual supply and demand cross section. In other words, the power generation business operator 52 creates the immediately preceding power generation plan at time t9 and submits information on the created immediately preceding power generation plan to the general power transmission and distribution business operator 50 at time t10. In response thereto, the general power transmission and distribution business operator 50 forecasts the immediately preceding power demand, formulates the immediately preceding power generation plan, and predicts (evaluates) whether or not the transmission equipment is to be overloaded (congested) based on the power demand forecast result and the power generation plan formulation result. In a case where it is predicted that the transmission equipment is to be overloaded, the general power transmission and distribution business operator 50 calculates the amount of suppression required to eliminate the overload and discloses information on the calculated suppression amount to the power generation business operator 52 on the homepage or the like at time t11. The power generation business operator 52 reviews the immediately preceding power generation plan at time t12 based on the disclosed information.

As described above, a series of processing becomes complicated in the event of transmission equipment overload (congestion). However, in a case where it is determined that no overload is to occur by raising the operation limit value from the operation limit value L1 to the operation limit value L2 as illustrated in FIG. 3, both the general power transmission and distribution business operator 50 and the power generation business operator 52 become free from the problem of power generation suppression attributable to congestion and the labor for power generation plan determination is reduced.

FIGS. 5A and 5B are characteristic diagrams illustrating the state of the power system according to an example of the present invention. FIG. 5A is a characteristic diagram of a fence power flow, and FIG. 5B is a characteristic diagram of an annual load duration curve. In FIG. 5A, the horizontal axis is month and day and the vertical axis is power flow (MW). In FIG. 5B, the horizontal axis is time and the vertical axis is power flow (MW). In FIGS. 5A and 5B, the actual power flow in the power system (power flow power P1+P2) is almost the operation limit value L1=13,000 (MW)=13.0 (GW) or less as indicated by the curve X1 but greatly fluctuates from month to month. In addition, the assumed power flow (power flow power P1+P2) when an increase in power demand in the power system is assumed often exceeds almost the operation limit value L1= 13,000 (MW)=13.0 (GW) as indicated by the curve X2 and greatly fluctuates from month to month.

Here, the output of the renewable energy apparatus 300 is suppressed in a case where the actual power flow (power flow power P1+P2) exceeds the operation limit value L1. For example, in a case where the actual power flow (power flow power P1+P2) exceeds the operation limit value L1=13.0 GW, the output of the renewable energy apparatus 300 needs to be suppressed for 5,760 hours (time when the curve X2 and the operation limit value L1=13.0 GW intersect) out of 8,760 hours (one year) as indicated by the curve X2.

On the other hand, on condition that it is possible to take a countermeasure in accordance with the calculation result of the assumed fault stabilization calculation unit 16 and raise the operation limit value from the operation limit value L1 to the operation limit value L2=17.0 GW, the suppression time of suppressing the output of the renewable energy apparatus 300 can be reduced to approximately 1,000 hours and, as a result, the fuel costs of, for example, the thermal power generators 301-1 and 301-2 can be reduced to a large extent. In this example, the fuel cost reduction amount of the thermal power generators 301-1 and 301-2 is approximately 5.4 TWh and, at a thermal fuel cost of 10 yen/kWh, an annual fuel cost reduction of approximately 54 billion yen can be anticipated and it can be said that the economic effect is considerable. In addition, as indicated by the arrow Y, the time of transmission line congestion can be reduced as the power demand in the power system increases.

FIG. 6 is a flowchart for describing the processing of the assumed fault stabilization calculation unit according to an example of the present invention. In FIG. 6, the assumed fault stabilization calculation unit 16 starts the processing by accessing a database (not illustrated) to be managed or accessed. Stored in the database at this time is data on the power generation plan value (power generation plan value of the thermal power generator), the demand forecast value (predicted value of the power demand in the power system), and the renewable energy output prediction value (predicted value of the output of the renewable energy apparatus 300), examples of which include data for each set time of the future that is data on a cross section for every 15 minutes up to 24 hours ahead.

The assumed fault stabilization calculation unit 16 first refers to the data stored in the database, sets system cross section data at evaluation time based on the referenced data (S201), and creates data on an assumed power flow cross section by a calculation method called power flow calculation based on the set system cross section data (S202).

Next, the assumed fault stabilization calculation unit 16 sets an assumed fault condition (S203). For example, the assumed fault stabilization calculation unit 16 sets various system faults such as N-1 (fault in which one facility stops from a normal occasion), N-2 (fault in which two facilities simultaneously stop from a normal occasion), or N-1-1 (fault in which one facility stops from a normal occasion and another facility stops during the continuation of the stop).

Next, the assumed fault stabilization calculation unit 16 executes transient stability countermeasure calculation by a method called transient stability calculation, for example, a method for obtaining a dynamic movement for approximately 10 seconds the event of a system fault (S204). In a case where the calculation result obtained at this time is that the system is to become unstable (synchronous generator operation is to be lost), the assumed fault stabilization calculation unit 16 executes calculation for stabilizing the system by generator output suppression, records the calculation result in the control countermeasure table, and transmits the information recorded in the control countermeasure table to the fault countermeasure execution device 30 as the control countermeasure information 530. At the same time, the assumed fault stabilization calculation unit 16 executes calculation for stabilizing the power system by suppressing the renewable energy output (output of the renewable energy apparatus 300), records the calculation result in the control countermeasure table, and transmits the information recorded in the control countermeasure table to the fault countermeasure execution device 30 as the control countermeasure information 530.

In a case where the fault countermeasure execution device 30 receives the control countermeasure information 530, the fault countermeasure execution device 30 executes generator output suppression processing and renewable energy output suppression processing based on the received control countermeasure information 530. In a case where the fault countermeasure execution device 30 executes the generator output suppression processing, the fault countermeasure execution device 30 generates, for example, a control command for suppressing the output of the thermal power generators 301-1 and 301-2 and outputs the generated control command to the control execution unit that controls the thermal power generators 301-1 and 301-2. The output of the thermal power generators 301-1 and 301-2 is suppressed by the control of the control execution unit, and then the power flow power flowing through the transmission line 100 and the transformer decreases.

In addition, in a case where the fault countermeasure execution device 30 executes the renewable energy output suppression processing, the fault countermeasure execution device 30 generates a control command for suppressing the output of the renewable energy apparatus 300 or a control command for an emergency stop of the renewable energy apparatus 300 and outputs the generated control command to the control execution unit 32-1. When the control execution unit 32-1 executes control for suppressing the output of the renewable energy apparatus 300 in accordance with the control command, the output of the renewable energy apparatus 300 is suppressed. In addition, when the control execution unit 32-1 executes control for an emergency stop of the renewable energy apparatus 300, the renewable energy apparatus 300 emergency-stops in, for example, approximately 0.2 S (second).

Next, the assumed fault stabilization calculation unit 16 determines whether or not there is a significant change in system voltage from the result of the transient stability calculation in step S204 and, in a case where it is determined that the system voltage deviates from a predetermined range, executes voltage maintenance calculation (S205). At this time, the assumed fault stabilization calculation unit 16 executes voltage maintenance calculation for maintaining the system voltage within a specified range by phase adjustment equipment control, records the calculation result in the control countermeasure table, and transmits the information recorded in the control countermeasure table to the fault countermeasure execution device 30 as the control countermeasure information 530. Recorded as the control countermeasure information 530 in the control countermeasure table in this case is voltage maintenance information configured information on phase adjustment equipment control indicating on-off control with respect to the phase adjustment equipment disposed in the power system (first information), information on transformer tap position adjustment for adjusting the tap position of the tap position adjustment-type transformer disposed in the power system (second information), information on generator output adjustment for adjusting the first output power (third information), and information on load shedding for shedding the load of the power system (fourth information).

In a case where the fault countermeasure execution device 30 executes phase adjustment equipment control based on the received control countermeasure information 530, the fault countermeasure execution device 30 generates a control command for maintaining the system voltage within specified range by the phase adjustment equipment control and outputs the generated control command to the control execution unit (not illustrated) that controls the phase adjustment equipment. When the control execution unit turns on, for example, a switch for connecting a capacitor or coil to the transmission line 100, the capacitor or the coil is connected to the transmission line 100. The voltage of the transmission line 100 increases when the capacitor connected to the transmission line 100, and the voltage of the transmission line 100 decreases when the coil is connected to the transmission line 100. As a result, the voltage of the power system is maintained within a specified range.

In addition, in a case where the fault countermeasure execution device 30 executes transformer tap adjustment processing based on the received control countermeasure information 530, the fault countermeasure execution device 30 generates a control command for maintaining the system voltage within a specified range by the transformer tap adjustment processing and outputs the generated control command to the control execution unit that executes the transformer tap adjustment processing. When the control execution unit adjusts, for example, the tap position or the tap position adjustment-type transformer, the ratio between the input voltage and the output voltage of the tap position adjustment-type transformer changes and the output voltage of the tap position adjustment-type transformer changes in accordance with the tap position. As a result, the voltage of the transmission line including the tap position adjustment-type transformer is maintained within a specified range.

Further, in a case where the fault countermeasure execution device 30 executes generator output adjustment processing based on the received control countermeasure information 530, the fault countermeasure execution device 30 generates, for example, a control command for adjusting the output of the thermal power generators 301-1 and 301-2 and outputs the generated control command to the control execution unit that controls the thermal power generators 301-1 and 301-2. The output of the thermal power generators 301 and 301-2 is adjusted by the control of the control execution unit, and then the voltage of the power system is maintained within a specified range.

In addition, in a case where the fault countermeasure execution device 30 executes load shedding processing based on the received control countermeasure information 530, the fault countermeasure execution device 30 generates, for example, a control command for shedding the load 400-1 and outputs the generated control command to the control execution unit 32-2. When the load 400 is shed by the control execution unit 32-2, the voltage of the bus 102 to which the load 400-1 connected is maintained within a specified range.

Next, the assumed fault stabilization calculation unit 16 executes overload countermeasure calculation in a case where determined that the power flowing through the transmission line or the transformer exceeds a predetermined magnitude (S206). At this time, the assumed fault stabilization calculation unit 16 executes overload countermeasure calculation for stabilizing the system by generator output suppression, records the calculation result in the control countermeasure table, and transmits the information recorded in the control countermeasure table to the fault countermeasure execution device 30 as the control countermeasure information 530. At the same time, the assumed fault stabilization calculation unit 16 executes overload countermeasure calculation for stabilizing the system by renewable energy output suppression, records the calculation result in the control countermeasure table, and transmits the information recorded in the control countermeasure table to the fault countermeasure execution device 30 as the control countermeasure information 530.

The fault countermeasure execution device 30 executes generator output suppression processing and renewable energy output suppression processing based on the received control countermeasure information 530. In a case where the fault countermeasure execution device 30 executes the generator output suppression processing, the fault countermeasure execution device 30 generates, for example, a control command for suppressing the output of the thermal power generators 301-1 and 301-2 and outputs the generated control command to the control execution unit that controls the thermal power generators 301-1 and 301-2. The output of the thermal power generators 301-1 and 301-2 is suppressed by the control of the control execution unit, and then the power flow power flowing through the transmission line 100 and the transformer decreases. As a result, it is possible to prevent the power flowing through the transmission line or the transformer from exceeding a predetermined magnitude to cause overload.

In addition, in a case where the fault countermeasure execution device 30 executes the renewable energy output suppression processing based on the received control countermeasure in 530, the fault countermeasure execution device 30 generates a control command for suppressing the output of the renewable energy apparatus 300 or a control command for an emergency stop of the renewable energy apparatus 300 and outputs the generated control command to the control execution unit 32-1. When the control execution unit 32-1 executes control for suppressing the output of the renewable energy apparatus 300 or control for an emergency stop of the renewable energy apparatus 300 in accordance with the control command, the output of the renewable energy apparatus 300 is suppressed and, in addition, the renewable energy apparatus 300 emergency-stops in, for example, approximately 0.2 S (second). As a result, it is possible to prevent the power flowing through the transmission line or the transformer from exceeding a predetermined magnitude to cause overload.

With the generator output and the renewable energy output suppressed as a result of these countermeasures, the frequency of the power system may decrease, and thus it is necessary to reduce the power demand of the power system.

In this regard, the assumed fault stabilization calculation unit 16 executes frequency countermeasure calculation (S207). At this time, the assumed fault stabilization calculation unit 16 executes frequency countermeasure calculation for rapidly increasing the generator output, records the calculation result (output adjustment amount) in the control countermeasure table, and transmits the information recorded in the control countermeasure table to the fault countermeasure execution device 30 as the control countermeasure information 530. At the same time, the assumed fault stabilization calculation unit 16 executes frequency countermeasure calculation for load shedding, records the calculation result (load to be shed) in the control countermeasure table, and transmits the information recorded in the control countermeasure table to the fault countermeasure execution device 30 as the control countermeasure information 530. Recorded as the control countermeasure information 530 in the control countermeasure table in this case are information on generator output adjustment for adjusting the first output power and information on load shedding for shedding the load of the power system.

The fault countermeasure execution device 30 executes generator output adjustment processing and load shedding processing based on the received control countermeasure information 530. In a case where the fault countermeasure execution device 30 executes the generator output adjustment processing, the fault countermeasure execution device 30 generates, for example, a control command for increasing the output of the thermal power generators 301-1 and 301-2 and outputs the generated control command to the control execution unit that controls the thermal power generators 301-1 and 301-2. The output of the thermal power generators 301-1 and 301-2 is increased by the control of the control execution unit, and then the frequency of the power system gradually decreases.

In addition, in a case where the fault countermeasure execution device 30 executes the load shedding processing, the fault countermeasure execution device 30 generates, for example, a control command for shedding the load 400-1 and outputs the generated control command to the control execution unit 32-2. When the load 400-1 is shed by the control execution unit 32-2, the frequency of the bus 102 to which the load 400-1 is connected gradually decreases.

Next, the assumed fault stabilization calculation unit 16 executes restoration countermeasure calculation (S208). At this time, in a case where the assumed fault stabilization calculation unit 16 determines that the frequency of the power system may decrease as the load recovers in the restoration process, the assumed fault stabilization calculation unit 16 executes restoration countermeasure calculation for increasing the generator output, records the calculation result in the control countermeasure table, and transmits the information recorded in the control countermeasure table to the fault countermeasure execution device 30 as the control countermeasure information 530. Recorded as the control countermeasure information 530 in the control countermeasure table in this case is restoration countermeasure information for returning the power flow state of the power system to the power flow state before the occurrence of a fault meeting the assumed fault condition, which is information on generator output adjustment for adjusting the first output power.

In case where the fault countermeasure execution device 30 executes the generator output adjustment processing based on the received control countermeasure information 530, the fault countermeasure execution device 30 generates, for example, a control command for increasing the output of the thermal power generators 301-1 and 301-2 and outputs the generated control command to the control execution unit that controls the thermal power generators 301-1 and 301-2. The output of the thermal power generators 301-1 and 301-2 is increased by the control of the control execution unit, and then the frequency of the power system gradually increases.

In addition, in a case where the assumed fault stabilization calculation unit 16 determines in step S208 that there is a transient increase in power system frequency attributable to the restart of the temporarily stopped renewable energy apparatus 300 attributable to, for example, a voltage drop or rise during the fault, the assumed fault stabilization calculation unit 16 executes restoration countermeasure calculation for conversely reducing the generator output in the generator output adjustment processing of the fault countermeasure execution device 30, records the calculation result (output adjustment amount) in the control countermeasure table, and transmits the information record in the control countermeasure table to the fault countermeasure execution device 30 as the control countermeasure information 530.

At this time, in a case where the fault countermeasure execution device 30 executes the generator output adjustment processing based on the received control countermeasure information 530, the fault countermeasure execution device 30 generates, for example control command for reducing the output of the thermal power generators 301-1 and 301-2 and outputs the generated control command to the control execution unit that controls the thermal power generators 301-1 and 301-2. The output of the thermal power generators 301-1 and 301-2 is reduced by the control of the control execution unit, and then a transient increase power system frequency is suppressed.

Next, the assumed fault stabilization calculation unit 16 determines whether or not there is a system problem such as overload occurrence, voltage drop, and frequency drop based on the processing results of steps S204 to S208 (S209). In a case where the assumed fault stabilization calculation unit 16 determines in step S209 that there a system problem, the assumed fault stabilization calculation unit 16 confirms the operation limit value applied to the system equipment at that time as the operation limit value (S210) and then ends the processing in this routine. For example, in a case where the operation limit value applied to the system equipment at that time is the first operation limit value=13,000 MW before the renewable energy apparatus 300 is connected to the power system, the assumed fault stabilization calculation unit 16 confirms the operation limit value as the first operation limit value=13,000 MW. It should be noted that the assumed fault stabilization calculation unit 16 confirms the operation limit value as the second operation limit value in case where the operation limit value is changed and the operation limit value applied to the system equipment is the second operation limit value after the renewable energy apparatus 300 is connected to the power system in the processing after step S211.

In a case where the assumed fault stabilization calculation unit 16 determines in step S209 that there is no system problem such as overload occurrence, voltage drop, and frequency drop, the assumed fault stabilization calculation unit 16 executes setting for expanding the operation limit value applied to the system equipment at that time (S211). For example, in a case where the operation limit value applied to the system equipment at that time is the first operation limit value=13,000 MW, the assumed fault stabilization calculation unit 16 expands the operation limit value by 50 MW from 13,000 MW to 13,050 MW in order to change the operation limit value from the first operation limit value to the second operation limit value.

Next, the assumed fault stabilization calculation unit 16 changes the generator output setting as the operation limit value applied to the system equipment is expanded (S212). For example, the assumed fault stabilization calculation unit 16 executes setting for changing the generator output in accordance with the expansion of the operation limit value. At this time, the assumed fault stabilization calculation unit 16 is capable of performing setting for reducing the output power of the thermal power generator in accordance with the expansion of the operation limit value.

Next, the assumed fault stabilization calculation unit 16 changes the renewable energy suppression amount setting (S213). At this time, the assumed fault stabilization calculation unit 16 executes, for example, change in setting for reducing the renewable energy suppression amount. In this case, the assumed fault stabilization calculation unit 16 is capable of performing setting for increasing the output power of the renewable energy apparatus 300 as the output power of the thermal power generator is reduced in accordance with the expansion of the operation limit value. Subsequently, the assumed fault stabilization calculation unit 16 shifts to the processing of step S202 and repeats the processing of steps S202 to S213.

It should be noted that in a case where a change in setting for reducing the renewable energy suppression amount is executed in step S213, the assumed fault stabilization calculation unit 16 creates in step S202 information on a new assumed power flow cross section in which the power flow on the transmission line, for example, the power flow (P1+P2) on the transmission line 100, is increased by increasing the output from the renewable energy apparatus 300. At this time, the assumed fault stabilization calculation unit 16 sequentially changes the output power (first output power) defined by the power generation plan value of the thermal power generator (first power source) and adds the predicted value of the output of the renewable energy apparatus 300, for example, an output prediction value assuming 100% rated output or 50% rated output, to the changed first output power to create information on a new assumed power flow cross section as power flow state information. Subsequently, the assumed fault stabilization calculation unit 16 executes processing such as the transient stability countermeasure calculation (S204) and the operation limit value expansion setting (S211) based on the newly created assumed power flow cross section information.

FIGS. 7A to 7D are characteristic diagrams illustrating the state of each part of the system in the event of a system fault in the power system according to an example of the present invention FIG. 7A is a characteristic diagram of the phase angle of the generator. FIG. 7B is a characteristic diagram of the terminal voltage of the generator. FIG. 7C is a characteristic diagram of the power flow power. FIG. 7D is a characteristic diagram of the frequency of the transmission line.

In a case where the system fault 200 indicating a ground fault on a one-line transmission line occurs on a transmission line of the power system, for example, the transmission line 100 through which the power flow power P1 normally flows as illustrated in FIG. 1, one of the two transmission lines may become unusable and the remaining one transmission line may be overloaded due to the system fault 200. In addition, during the continuation of the system fault 200, the thermal power generator 301-1 or the thermal power generator 301-2 starts to accelerate due to the voltage drop on the transmission line 100. In this case, by selecting the renewable energy apparatus 300 and performing an emergency stop within a short time after the occurrence of the system fault 200, it is possible to prevent the thermal power generator 301-1 near the point of the system fault 200 from accelerating and stepping out.

Specifically, in the event of the system fault 200 on the transmission line 100, one of the two transmission lines becomes unusable, the remaining one transmission line is overloaded, the phase angle of the thermal power generator 301-1 rapidly increases as illustrated in FIG. 7A, the terminal voltage of the thermal power generator 301-1 rapidly decreases as illustrated in FIG. 7B, the power flow power drops below the transmission limit as illustrated in FIG. 7C, and the frequency of the transmission line 100 rapidly increases as illustrated in FIG. 7D. At this time, when the renewable energy apparatus 300 is selected and emergency-stopped at 0.2 S (second) after the occurrence of the system fault 200, the power supply from the renewable energy apparatus 300 to the transmission line 100 is stopped and the overload of the remaining one transmission line of the transmission line 100 is suppressed. As a result, after 0.2 S (second) after the occurrence of the system fault 200, the phase angle of the thermal power generator 301-1 gradually shifts to converge to the set value as illustrated in FIG. 7A, the terminal voltage of the thermal power generator 301-1 is gradually maintained at a predetermined voltage as illustrated in FIG. 7B, the power flow power is gradually maintained near the transmission limit as illustrated in FIG. 7C, and then the overload of the transmission line 100 is eliminated. In addition, as illustrated in FIG. 7D, the frequency of the transmission line 100 gradually decreases and is maintained at a specified value.

Here, it is necessary to consider that it takes approximately several seconds to 10 seconds to emergency-stop the renewable energy apparatus 300. Meanwhile, the thermal power generator 301-2 is far from the point of the system fault 200 and thus can be shut off in hundreds of milliseconds. Accordingly, in terms of preventing the thermal power generator 301-1 from accelerating and stepping out, an emergency shutoff of the thermal power generator 301-2 is more preferable than an emergency stop of the renewable energy apparatus 300.

In the event of an emergency shutoff of the thermal power generator 301-2, the frequency of the power system starts to decrease with steep characteristics, and thus it is necessary to shed the loads 400-1 and 400-2 connected the transmission line 101 branching off from the transmission line 100. Although the voltage of the bus 102 to which the transmission line 101 is connected rises or falls in this case, when the voltage of the bus 102 rises, the magnitudes of the loads 400-1 and 400-2 also change, and thus it is appropriate for the control execution unit 32-2 to autonomously reselect the load to be shed based on a value measured by a voltage measuring unit 33 measuring the voltage of the bus 102.

In this example, the operation limit value calculation unit 15 functions as an operation limit value management unit (operation limit value management program) managing the operation limit value related to the power flow power of the system equipment. The assumed fault stabilization calculation unit 16 functions as a determination unit (determination program) calculating the power flow state for each set time of the future of the power system based on the load dispatching information including the power generation plan value of the first power source (thermal power generator), a predicted value of the output of the second power source (renewable energy apparatus), and predicted value of the power demand in the power system and determining whether or not stable is each calculated power flow state by comparing each calculated power flow state with the operation limit value.

At this time, the determination unit sequentially changes the first output power of the first power source defined by the power generation plan value of the first power source, calculates each power flow state based on the power including the changed first output power and predicted value of the output of the second power source, and outputs the calculation result to the operation limit value management unit. On condition that a positive determination result (stable) obtained from the determination unit, the operation limit value management unit manages the operation limit value of the system equipment at each set time of the future as the sum of the changed first output power (output power of the thermal power generator) and the predicted value of the output of the second power source added to the changed first output power (predicted value of the output of the renewable energy apparatus). In addition, the operation limit value management unit transmits the operation limit value information including the operation limit value of the system equipment at each set time of the future to the load dispatching control station system 20. As a result, the operation limit value information including the operation limit value of the system equipment at each set time of the future can be presented to the operator of the load dispatching control station system 20. In addition, in the load dispatching control station system 20, processing and control can be executed in accordance with the operation limit value information.

In addition, in this example, the assumed fault stabilization calculation unit 16 functions as determination unit (determination program) determining whether or not the power system is stable, an assumed fault condition setting unit (assumed fault condition setting program) setting an assumed fault condition indicating a condition of a fault assumed to occur in the power system at each set time of the future based on the load dispatching information, and a control countermeasure information generation unit (control countermeasure information generation program) generating control countermeasure information indicating a control countermeasure in the event of a fault meeting the assumed fault condition based on the load dispatching information. At this time, the control countermeasure information generation unit is capable of generating, as the control countermeasure information, power source stop information for stopping at least one of a part of the first power source (thermal power generator 301-2) and the second power source (renewable energy apparatus 300) and load shedding information for shedding the load connected to the first power source on condition that a part of the first power source is stopped and transmitting the generated power source stop information and load shedding information to the load dispatching control station system 20 and the fault countermeasure execution device 30. As a result, in the load dispatching control station system 20 and the fault countermeasure execution device 30, processing and control can be executed in accordance with the power source stop information and the load shedding information.

In addition, the control countermeasure information generation unit generates, as the control countermeasure information 530, overload countermeasure information for eliminating the load of the first power source becoming overload or transient stability countermeasure information for maintaining stability with respect to the power system. At this time, the overload countermeasure information and the transient stability countermeasure information are configured by a generator output suppression amount for first output power suppression and a renewable energy output suppression amount for second output power suppression. In addition, the control countermeasure information generation unit generates voltage maintenance information for maintaining the voltage of the power system within a set voltage range, frequency countermeasure information for maintaining the frequency of the power system within a set frequency range, and restoration countermeasure information for returning the power flow state of the power system to the power flow state before the occurrence of a fault meeting an assumed fault condition.

According to this example, the operation limit value of the system equipment can be changed in accordance with the power flow state of the power system even in the event of an increase in the output power of the renewable energy apparatus 300 connected to the power system. In other words, even in the event of an increase in power from the renewable energy apparatus 300, by changing the operation limit value of the system equipment in accordance with the power flow state of the power system, it is possible to reduce the congestion time of the power system, reduce the amount of suppression of the renewable energy apparatus 300, promote the introduction of the renewable energy apparatus 300, and reduce the output power of the thermal power generators 301-1 and 302-2 and, as a result, the amount of $CO_2$ emitted from the thermal power generators 301-1 and 302-2 can be reduced. At this time, as countermeasures when the power system is unstable, output adjustment information for adjusting at least one of the thermal power generators 301-1, 302-2, and 302-3 and the renewable energy apparatus 300 and control countermeasure information with respect to a power system fault are prepared, and thus a contribution can be made to power system stabilization. Further, even in the event of an increase in renewable energy power source, it is possible to optimize the operation limit value of the system equipment and prevent unnecessary mass suppression of renewable energy.

It should be noted that the present invention includes various modification examples without being limited to the examples described above. For example, in an alternative form, a display terminal instead of the fault countermeasure device 30 is in in the load dispatching control station system 20, operation limit value information is further displayed on the display terminal as a result of assumed fault stabilization countermeasure calculation and fault restoration calculation, and the information displayed on the display terminal is presented as support information to an operator, a system planning engineer, a system protection design engineer, and a system analysis engineer using the load dispatching control station system 20.

In addition, the renewable energy apparatus 300 is not limited to wind power generation and photovoltaic power generation. Also usable is a device with an inverter such as a storage battery device storing or generating electric energy, examples of which include a lithium ion battery and a fuel cell.

Further, another configuration can be added to, is capable of deleting, or is capable of replacing a part of the configuration of the example. In addition, each of the above configurations, functions, processing units, processing means, and so on may be realized by hardware in whole or in part by, for example, integrated circuit-based design. In addition, each of the above configurations, functions, and so on may be realized by software by a processor interpreting and executing a program realizing each function. Information such as a program, a table, and a file realizing each function can be recording device such as a memory, a hard disk, and a solid state drive (SSD) or a recording medium such as an integrated circuit (IC) card, a secure digital (SD) memory card, and a digital versatile disc (DVD).

REFERENCE SIGNS LIST

1: power system system
10: renewable energy system stabilization system
11: system configuration creation unit
12: future power flow cross section calculation unit
13: general calculation unit
14: system data storage unit
15: operation limit value calculation unit
16: assumed fault stabilization calculation unit
17: fault restoration calculation unit
20: load dispatching control station system
30: fault countermeasure execution device
100, 101: transmission line
102: bus
300: renewable energy apparatus
301-1, 301-2, 301-3: thermal power generator

The invention claimed is:
1. A renewable energy system stabilization system supporting operation of a power system connecting a load and at least one of a first power source including a thermal power generator generating electricity using at least thermal power as power generation energy and a second power source including a renewable energy apparatus generating electricity with renewable energy, the system comprising:
  an operation limit value management unit managing an operation limit value related to power flow power of system equipment; and
  a determination unit calculating a power flow state for each set time of future of the power system based on load dispatching information including a power generation plan value of the first power source, a predicted value of output of the second power source, and a predicted value of power demand in the power system and determining whether or not stable is each calculated power flow state by comparing each calculated power flow state with the operation limit value, wherein
  the determination unit sequentially changes first output power of the first power source defined by the power generation plan value of the first power source, calculates each of the power flow states based on power including the changed first output power and the predicted value of the output of the second power source, and outputs a result of the calculation to the operation limit value management unit, and
  on condition that a positive determination result is obtained from the determination unit, the operation limit value management unit manages the operation limit value at each set time of the future as a sum of the changed first output power and the predicted value of the output of the second power source added to the changed first output power.

2. The renewable energy system stabilization system according to claim 1, wherein the operation limit value management unit transmits operation limit value information including the operation limit value at each set time of the future to a load dispatching control station system operating the power system.

3. The renewable energy system stabilization system according to claim 1, further comprising an output adjustment information generation unit generating output adjustment information for adjusting at least one of output power of the first power source and output power of the second power source on condition that a negative determination result is obtained from the determination unit.

4. The renewable energy system stabilization system according to claim 3, wherein the output adjustment information generation unit transmits the output adjustment information to a load dispatching control station system operating the power system.

5. The renewable energy system stabilization system according to claim 1, further comprising:
an assumed fault condition setting unit setting an assumed fault condition indicating a condition of a fault assumed to occur in the power system at each set time of the future based on the load dispatching information; and
a control countermeasure information generation unit generating control countermeasure information indicating a control countermeasure in an event of a fault meeting the assumed fault condition based on the load dispatching information.

6. The renewable energy system stabilization system according to claim 5, wherein the control countermeasure information generation unit transmits the control countermeasure information to at least one of a fault countermeasure execution device managing each of the first power source and the second power source as a control object and a load dispatching control station system operating the power system.

7. The renewable energy system stabilization system according to claim 5, wherein the control countermeasure information generation unit generates, as the control countermeasure information, power source stop information for stopping at least one of a part of the first power source and the second power source and load shedding information for shedding a load connected to the first power source on condition that a part of the first power source is stopped.

8. The renewable energy system stabilization system according to claim 5, wherein the control countermeasure information generation unit generates, as the control countermeasure information, overload countermeasure information for eliminating a load of the first power source becoming overload, transient stability countermeasure information for maintaining stability with respect to the power system, voltage maintenance information for maintaining a voltage of the power system within a set voltage range, frequency countermeasure information for maintaining a frequency of the power system within a set frequency range, and restoration countermeasure information for returning the power flow state of the power system to a power flow state before the occurrence of the fault meeting the assumed fault condition.

9. A system stabilization support method in a system supporting operation of a power system connecting a load and at least one of a first power source including a thermal power generator generating electricity using at least thermal power as power generation energy and a second power source including a renewable energy apparatus generating electricity with renewable energy, the method comprising:
an operation limit value management step of managing an operation limit value related to power flow power of system equipment; and
a determination step of calculating a power flow state for each set time of future of the power system based on load dispatching information including a power generation plan value of the first power source, a predicted value of output of the second power source, and a predicted value of power demand in the power system and determining whether or not stable is each calculated power flow state by comparing each calculated power flow state with the operation limit value, wherein
in the determination step, first output power of the first power source defined by the power generation plan value of the first power source is sequentially changed and each of the power flow states is calculated based on power including the changed first output power and the predicted value of the output of the second power source, and
in the operation limit value management step, on condition that a positive determination result is obtained in the determination step, the operation limit value at each set time of the future is managed as a sum of the first output power changed in the determination step and the predicted value of the output of the second power source added to the changed first output power.

10. The system stabilization support method according to claim 9, wherein, in the operation limit value management step, operation limit value information including the operation limit value at each set time of the future is transmitted to a load dispatching control station system operating the power system.

11. The system stabilization support method according to claim 9, further comprising an output adjustment information generation step of generating output adjustment information for adjusting at least one of output power of the first power source and output power of the second power source on condition that a negative determination result is obtained in the determination step.

12. The system stabilization support method according to claim 11, wherein, in the output adjustment information generation step, the output adjustment information is transmitted to a load dispatching control station system operating the power system.

13. The system stabilization support method according to claim 9, further comprising:
an assumed fault condition setting step of setting an assumed fault condition indicating a condition of a fault assumed to occur in the power system at each set time of the future based on the load dispatching information; and
a control countermeasure information generation step of generating control countermeasure information indicating a control countermeasure in an event of a fault meeting the assumed fault condition based on the load dispatching information.

14. The system stabilization support method according to claim 13, wherein, in the control countermeasure information generation step, the control countermeasure information is transmitted to at least one of a fault countermeasure execution device managing each of the first power source and the second power source as a control object and a load dispatching control station system operating the power system.

15. The system stabilization support method according to claim 13, wherein, in the control countermeasure information generation step, power source stop information for stopping at least one of a part of the first power source and the second power source and load shedding information for shedding a load connected to the first power source on condition that a part of the first power source is stopped are generated as the control countermeasure information.

\* \* \* \* \*